United States Patent [19] [11] 4,131,342
Dudley [45] Dec. 26, 1978

[54] STEREOSCOPIC OPTICAL VIEWING SYSTEM

[76] Inventor: Leslie P. Dudley, 11088 Ophir Dr., #307, Los Angeles, Calif. 90024

[21] Appl. No.: 750,430

[22] Filed: Dec. 14, 1976

Related U.S. Application Data

[63] Continuation of Ser. No. 606,763, Aug. 22, 1975, abandoned, which is a continuation-in-part of Ser. No. 518,356, Oct. 29, 1974, abandoned.

[51] Int. Cl.² ............................................. G03B 21/32
[52] U.S. Cl. ....................................... 352/43; 352/86; 352/87
[58] Field of Search .................. 350/132, 133, 144; 352/43, 87, 52, 48, 49, 50, 51, 52, 86, 87

[56] References Cited

U.S. PATENT DOCUMENTS

| | | | |
|---|---|---|---|
| 1,394,797 | 10/1921 | Smith | 352/43 |
| 1,742,680 | 1/1930 | Artigue | 352/49 |
| 2,244,687 | 6/1941 | Goldsmith | 352/49 |
| 2,281,033 | 4/1942 | Garity | 352/49 |
| 2,996,949 | 8/1961 | Le Ray | 352/60 |
| 3,228,742 | 1/1966 | Hand | 352/52 |
| 3,256,776 | 6/1966 | Land | 352/43 |
| 3,586,426 | 6/1971 | Bras | 352/52 |

Primary Examiner—Monroe H. Hayes
Attorney, Agent, or Firm—Keith D. Beecher

[57] ABSTRACT

An optical viewing system and method is described, whose operating principles are based on two psycho-physiological characteristics of the human visual system. One of these characteristics is the time delay between the arrival of a light stimulus or image on the retina of the eye and its recognition or interpretation at the visual cortex. The other characteristic is the non-achromatism of the eye. The first of these characteristics manifests itself in the so-called Pulfrich illusion, a moving object being apparently displaced from its actual path when viewed by an observer with a neutral filter in front of one eye, as differential visual time-lag results from the difference in brightness of the two retinal images. The second characteristic manifests itself in the so-called chromostereoscopic effect which, under certain conditions, creates the illusion that differently colored objects, although actually at the same distance from an observer, are at different distances from him.

5 Claims, 9 Drawing Figures

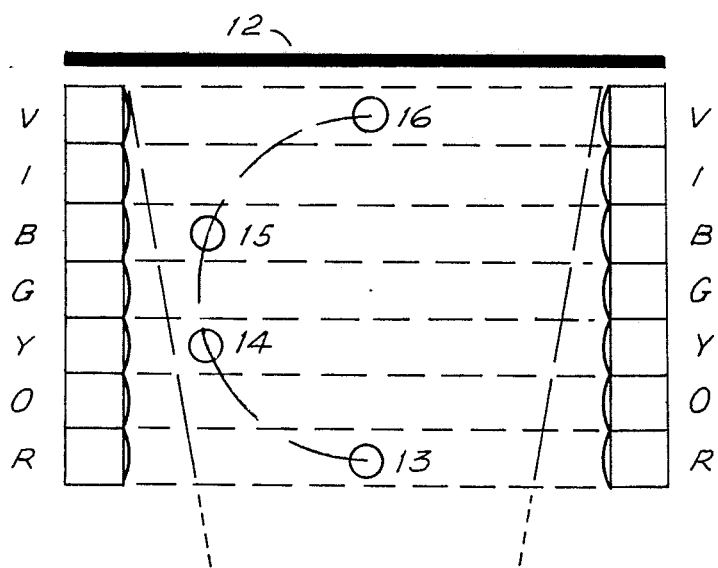

STEREOSCOPIC OPTICAL VIEWING SYSTEM

This application is a continuation of copending application Ser. No. 606,763, filed Aug. 22, 1975 now abandoned, which in turn, is a continuation-in-part of copending application Ser. No. 518,356 which was filed Oct. 29, 1974, and which has now been abandoned.

BACKGROUND OF THE INVENTION

The stereoscopic optical viewing system and method herein described is based on the utilization of two psycho-physiological characteristics of the human visual system. One of these characteristics is the time delay between the arrival of a light stimulus or image on the retina of the eye and its recognition or interpretation at the visual cortex. The other characteristic is the non-achromatism of the eye. These characteristics will now be discussed.

In 1943, the present inventor conducted a program of research on behalf of the British Admiralty Department of Scientific Research and Experiment (now the Royal Naval Scientific Service) into the phenomenon known generally as the Pulfrich illusion. This phenomenon manifests itself when an observer, using both eyes, but with a neutral filter or color filter in front of one eye, watches a pendulum swinging transversely across his field of view. The pendulum, although actually oscillating in one plane, appears to be travelling in an elliptical orbit, its apparent direction in the orbit being clockwise if the filter be before the observer's left eye, and counter-clockwise if the filter be before his right eye.

Previous research by the present inventor showed that the fundamental cause of the Pulfrich illusion lies in the difference in time required to assimilate visual impressions of objects of different degrees of brightness. Accordingly, he gave the name "visual time-lag" to the psycho-physiological characteristic itself, and "differential visual time-lag" to the effect resulting from the use of a filter before one eye. These terms are now generally accepted.

Some of the results of the inventor's research were published in a paper by him entitled "Visual Time-Lag" which appeared in the Faraday House Journal (Lent Term Issue, 1944). These results may be summarized briefly as follows:

(a) An object moving transversely across the field of vision appears to travel in a path nearer to, or further from, the observer than the actual path, according to which eye be used in conjunction with the filter, and according to whether the movement be from left to right, or vice versa. For a given observer the magnitude of the displacement between the true and apparent paths is dependent upon the color and density of the filter, the velocity and luminosity of the object, and the distance of the observer from the object.

(b) An object moving horizontally in a straight line towards or away from the observer appears to travel in a path displaced to one side or the other of the true path, the magnitude and direction of the displacement being dependent upon the factors mentioned under paragraph (a) supra.

(c) An object moving vertically through the field of vision appears to travel in a path either nearer to, or further from, the observer than the true path, the magnitude and direction of the displacement again being dependent upon the factors indicated under paragraph (a) supra.

From the observed facts, as summarized above, it is possible to demonstrate, with the aid of simple optical ray diagrams, that the use of a monocular filter does in fact increase the visual time-lag of one eye with respect to the other eye. It is considered, however, that the inclusion of such diagrams in the present specification would unnecessarily encumber the description of the present invention, and such diagrams are not deemed necessary for a complete understanding of the invention. One such diagram relating to the pendulum experiment referred to above, is included in the aforementioned publication.

As a result of tests with numerous observers, the inventor has determined that differential visual time-lag (DVTL) is a maximum when a neutral filter having a density in the region of 1.0 that is, between about 0.9 and 1.1, is used. He has also found that the effects of differential visual time-lag can still be observed if moving objects, such as those produced by cinematography and television, be substituted for actual moving objects. He has determined, further, that in the case of such images, the effect is generally a maximum for picture details or constituents which move transversely across the observer's field of view in a time of about one or two seconds. The effect becomes difficult to perceive with transit times in excess of about six or eight seconds, or less than one second.

From the foregoing discussion, it will be understood that, with a cinematograph or television camera moving transversely with appropriate velocity with respect to the subject, or with the subject moving appropriately with respect to the camera, it is possible to produce images which exhibit a stereoscopic effect when viewed with the aid of a monocular filter. The necessity for careful control of the relative motion between the camera and subject matter renders the system particularly suitable for use in the production of animated cartoons, as the necessary motion control can be effected more easily in such a case than when filming or televising actual scenes or objects.

Such a system has the great advantage of being compatible with present day television or cinematographic systems in the sense that, without the monocular filter in use, only a single set of images is visible to both eyes so that a clearly discernible, two-dimensional reproduction is observed. With polarized or chromatic anaglyphs, on the other hand, unless the observer uses appropriate viewing spectacles, two sets of out-of-register images are visible to both eyes, thereby rendering the pictures undecipherable, so that such anaglyphs are not compatible with present day two-dimensional systems.

In the case of chromostereoscopy, the lens of the eye, like any other single-element lens, is not color-corrected. In consequence of the non-achromatism, images of different colors would be brought into focus at different distances from the retina were it not for the accommodative power of the eye. This accommodative power resides in the ability of the ocular muscles to vary the curvature of the eye lens in such a way that not only objects at different distances, but also objects of different colors, can be brought into sharp focus. However, the eye cannot, in general, accommodate perfectly for both distance and color simultaneously, the curvature of the eye lens changing continually as the observer directs his attention from one part of a scene to another.

Since the changes in curvature of the eye lens which are involved in looking at objects at different distances are usually much greater than those necessitated by color differences, human beings have become accustomed to interpreting, sometimes quite erroneously, all accommodative effort arising in every day visual experience as being associated only with the relative distances of the objects seen. For example, in the case of two signal lights of equal brightness, one red, the other green, and both equally distant from an observer who views the lights against a dark background, such as the night sky, the red light will appear to be nearer than the green light. This is because the observer's eyes must accommodate differently for the two different colors, and past visual experience with more common types of objects misleads him to believe that the change in accommodation is due to a difference in the distances of the lights. This phenomenon is generally known as "chromostereoscopy".

For the average observer, accommodation for nonachromatism causes the apparent distances of differently colored objects to be greater for those colors near the high-frequency end of the visible spectrum and least for those colors near the low-frequency end of the spectrum. Thus, for example, in the case of seven objects colored respectively violet, indigo, blue, green, yellow, orange and red, equally distant from an average observer viewing the objects against a dark background, the violet object will appear to be the most distant, the red object will appear to be the nearest, and the other five objects will appear to be at intermediate distances, in the order listed, as governed by the relative positions of their colors in the visible spectrum.

The chromostereoscopic effect is not particularly noticeable in general visual experience in daylight, as it is usually overshadowed by other stereoscopic clues, particularly binocular parallax. It becomes more pronounced with advancing age of the observer, chromatic aberration being increased by the development of malformations of the eye lens, and accommodation necessitating greater effort as the ocular muscles become atrophied. There is, however, a technique by which the chromostereoscopic effect can be artificially enhanced for the average observer to an extent such that the other stereoscopic clues are overridden, thereby creating a sensation of depth perception with the aid of pictorial representations which actually exist in only a single plane.

It is a feature of the present invention to provide a system in which an enhanced chromostereoscopic effect is utilized, in conjunction with the above-described differential visual time-lag effect, to produce stereoscopic cinematograph or television pictures, particularly those of the animated cartoon variety.

In the system and method of the invention to be described, the chromostereoscopic effect is enhanced, in part, by the provision of a viewing device, such as a pair of spectacles, in which one or both of the eyepieces contains a dispersive optical element, such as a narrow-angle prism, for the purpose of increasing the chromatic aberration of one or both of the eyes of the observer. The prism, as will be described subsequently herein, may be fabricated from a thin sheet of transparent plastic material of substantially uniform thickness throughout, but which has one surface scribed with a number of fine, parallel, wedge-shaped grooves. The net effect of the grooves is that the thin sheet of material is thereby provided with a refractive power corresponding to that of a more bulky, wedge-shaped prism.

As a result of a series of tests, the inventor has determined that, for the majority of observers, the most satisfactory value for the total power of the prism lies between 6 and 8 diopters. The former value is suitable for viewing a television or home movie screen from a distance of several feet; and the latter value is preferable for shorter viewing distances, such as those customarily adopted in reading. Whether only a single prism before one eye, or a pair of prisms, one before each eye, be used is found to be of little importance to the average observer. Thus, for example, in those cases in which a single prism before one eye having a power of 6 diopters is satisfactory, this may be replaced by a pair of prisms, one before each eye having a total power of 6 diopters; for example, 3 diopters for each prism, or 4 diopters for one prism and 2 diopters for the other prism. Each prism should be located in front of the corresponding eye with the base inward, that is, with the base towards the nose.

To an observer equipped with such a prismatic viewing device, a correctly produced two-dimensional picture will exhibit a stereoscopic effect. In order to produce such a picture, it is necessary to ensure that the colors of the various constituent parts thereof are appropriately correlated with the spatial relationship in wich it is desired that these constituent parts shall be perceived stereoscopically. Thus, a satisfactory chromostereoscopic picture of a girl standing in front of a green hedge or clump of bushes can be produced if she be depicted as wearing an orange or red dress. If, on the other hand, the picture be one of a girl wearing a green dress and standing in front of a red brick wall, the result will be pseudoscopic, as the girl will appear to recede into the wall.

It is found that, in general, it is preferable for the principal features comprising a chromostereoscopic picture to be outlined in black, as this minimizes an effect which may be termed ocular conflict. This is an effect which is produced by the use of colors, for the adjoining features in a picture, which are not widely separated in the spectral range. Let us take, for example, a picture showing a green parrott against a blue sky background. The observer's eye, when examining the outline of the parrot, tends to assume a compromise accommodation for blue-green, a shade somewhere between that of the sky and that of the parrot, with the result that little sensation of depth is stimulated. If, however, the parrot be outlined in black, the observer is enabled to compare both the color of the parrot and that of the adjacent area of the sky with the black outline, thereby enhancing the sensation of depth.

With the appropriate placement of objects and selection of colors, it is possible, as will be described, to produce photographic or television images of actual scenes or subjects, instead of drawings, which exhibit a chromostereoscopic effect.

It is a further feature of the present invention to provide a system in which the production of such images is facilitated. To this end, one embodiment of the invention includes, for example, special lighting equipment for the illumination of the scene or subject in such a manner that the light incident on objects near the camera is of lower frequency than the light incident on the more distant objects.

It is noted that the chromostereoscopic effect, unlike the differential visual time-lag effect, is not in any way dependent on motion. Thus, utilizing the chromostereoscopic effect alone, it is possible to produce either a still or moving picture which exhibits a stereoscopic effect. However, when a part or the whole of the scene is in motion, the stereoscopic effect can be enhanced by also using the differential visual time-lag effect. Another embodiment of the invention to be described provides means whereby differential visual time-lag and chromostereoscopy can be employed is combination so that, in the case of scenes in which there is movement, both phenomena can contribute to the three-dimensional effect, and, where there is no movement in the scene, the three-dimensional effect is nevertheless produced by chromostereoscopy.

In order to make the most effective use of differential visual time-lag and chromostereoscopy in combination, three basic requirements must be satisfied. These requirements are: (1) the relative motion of objects in the moving picture to be displayed must be controlled in an appropriate manner, (2) those objects and the background must be provided with, or possess, appropriate colors, (3) the observer must view the picture through an optical viewing device which induces the differential visual time-lag and which also enhances the chromostereoscopic effect.

In referring to the Pulfrich illusion, the fact has already been mentioned that when an observer, with a neutral filter in front of one eye, watches a transversely swinging pendulum, the pendulum appears to travel clockwise in an elliptical orbit if the filter is before the left eye of the observer, and counter-clockwise in the elliptical orbit if the filter is in front of the observer's right eye. This is due to the fact that, with the filter before his left eye, an object moving from right to left is apparently displaced towards the observer from its actual path; whereas, with the filter before the right eye, the object is apparently displaced away from the observer. Similarly, with the filter before the left eye of the observer, an object moving from left to right is apparently displaced from its actual path away from the observer; whereas, with the filter before the right eye, the object is apparently displaced toward the observer from its actual path.

It is thus evident that, whichever one of the observer's eyes be equipped with a neutral filter, a satisfactory stereoscopic effect will be obtained, provided that the motion of the object filmed or televised is controlled in an appropriate and consistent manner. However, it is sometimes desired to introduce laterally moving titles and other reading matter into the scene, which material should move across the viewing screen from right to left in order that it can be read conventionally by the observer from left to right. As it is usually preferable for such material to appear in front of, rather than behind, the plane of the viewing screen, there is some slight advantage in producing film and television programs in a manner appropriate for viewing by the observer with the filter before his left eye. Accordingly, it will be assumed hereinafter that the filter is in front of the observer's left eye. However, it is to be understood that the scope of the invention is not limited to that particular placement of the filter.

In order to understand the technique employed in producing a program of the animated cartoon type which, when viewed subsequently with the air of a neutral filter, will be seen stereoscopically due to differential visual time-lag, it is necessary to appreciate the following facts: The magnitude of the apparent displacement of a picture detail or character in a direction normal to the surface of the screen on which the imagery is being reproduced is proportional to the horizontal velocity with which the detail or character moves. In consequence of this relationship, the same production data are applicable regardless of the size of the screen or screens on which the program will subsequently be reproduced. Thus, let us suppose that when some segment of the program is being viewed on a small TV screen 1 foot wide the apparent depth of the scene is 6 inches, i.e., 50 percent of the screen width. If the same segment is viewed on a screen 10 feet wide the horizontal velocity of the moving pictorial material will be increased by a factor of 10 times with the result that the apparent depth of the scene is now 60 inches, i.e., 50 percent of the screen width as in the case of the smaller screen. Hence, assuming that the perspective is correct with one screen, it is also correct with the other.

Earlier in the specification it is mentioned that the differential visual time-lag effect is a maximum for picture details which move transversely across the observer's field of view in a time of about one or two seconds, the effect being difficult to perceive with transit times in excess of about 6 or 8 seconds. In producing an animated cartoon program the term "transit time" is used to define the time taken by a character or picture detail to move transversely through a distance equal to the width of the screen on which the program is subsequently reproduced.

The following example is based on the premise that a cartoon program is being recorded on motion picture film for subsequent exhibition at the standard rate of 24 frames per second. A segment of the program lasting 10 seconds, and therefore occupying 240 frames, is to show a small boy running from right to left past some trees. Hence, 240 drawings of the boy are required, each showing his limbs in progressively different positions to portray the effect of running. The drawings are made with opaque pigment on transparent cells or supports in the manner known to those familiar with animation techniques. It is of little consequence whether the boy be shown in the same position, such as in the center, on each cell or whether he be depicted as moving gradually from the right-hand edge to the left-hand edge; owing to the fact that he is to remain within the field of the camera lens in each frame recorded, he will appear to be in the same plane as the TV or motion picture screen when the program is exhibited. In addition to the drawings of the boy, 240 background drawings representing trees, sky, etc. are required for placement, in succession, behind the pictures of the running boy. These background pictures should show the trees and other details moving from left to right fairly rapidly, say in transit times of 3 seconds, corresponding to 72 frames. This will cause the background scenery to appear displaced in space behind the boy when this segment of the program is exhibited. The effectiveness of this scene can be further enhanced by the addition of 240 further drawings representing moving foreground material, such as running animals or birds in flight, these drawings being placed in sequence, one at a time, in front of the drawings of the boy and the background. The foreground drawings, like those of the boy, are made with opaque pigment on transparent cells or supports. If the animals, birds or other characters depicted move from right to left in transit times of, say, 2 seconds, they will appear displaced in space in front of the boy when the scene is exhibited.

It is also understood that the numbers given in this example have been quoted as being representative and not by way of limitation. It is to be further understood that, although a manual animation technique has been described, the invention is not limited to this method. Thus, the use of a multiplicity of manually produced drawings can, if desired, be replaced by computer generated pictures, the necessary speeds of movement, changes in aspect, etc. being controlled by the computer program.

In order to produce the best possible result, it is desirable, when feasible, to combine the chromostereoscopic effect with the differential visual time-lag effect when producing a cartoon program. Thus, in the preceding example, it would be preferable for the animals or birds in the foreground to have a reddish hue, and for the boy's clothing to have a color, such as yellow, spaced in the spectrum between the color of the foreground material and the greens and blues in the background. Naturally, it is not always feasible to maintain the ideal color relationship throughout an entire program. However, the differential visual time-lag effect is invariably stronger than the chromostereoscopic effect; consequently, a good stereoscopic effect due to the former phenomenon is still obtainable when it is necessary to depart from the ideal color relationship or when the program is viewed on a black-and-white TV receiver.

In the earlier discussion of chromostereoscopy, attention has been drawn to the fact that objects having colors in the low-frequency region of the visible spectrum appear to be nearer the observer than objects having colors in the high-frequency region, this effect being increased when one or each of the observer's eyes views the objects through a narrow-angle prism.

Reverting to the example of a girl in an orange or red dress standing in front of a green foliage background, let us now support that it is desired for her to move transversely with respect to the background so that the effects of chromostereoscopy and differential visual time-lag may be usefully combined. Assuming that the left eyepiece of the observer's viewing device is provided with the neutral filter, then, obviously, it is necessary for the girl to move from right to left. If she were to move from left to right, the chromostereoscopic effect would be largely, if not completely, neutralized by the tendency of the inappropriate movement to produce a pseudoscopic effect.

It is considered that the foregoing example is sufficient to show the manner in which the transverse movements of objects should be correlated with the colors of those objects in order to achieve the best result. Correlation in this way is necessary whether the subjects being filmed or televised are, themselves, three-dimensional or whether they are two-dimensional illustrations.

Attention has been drawn previously to the fact that, whereas a neutral filter is required in front of only one eye of the observer to produce the differential visual time-lag effect, enhancement of the chromostereoscopic effect may be accomplished by the use of a single prism in front of either one of the observer's eyes, or by the use of two prisms, one in front of each eye. Accordingly, a viewing device suitable for observation of both effects may taken any one of several different forms.

From the constructional point of view, the most simple viewing device comprises just a single optical element, this being a prism fabricated from material having the required netural density. Thus, in this case it is not absolutely essential for the viewing device to be in the form of a pair of spectacles, as the observer can hold the prism in front of the appropriate eye. Almost as simple is an alternative arrangement comprising a piece of neutral filter material laminated to the surface of a narrow-angle prism.

Further suitable alternatives comprise: (a) a neutral filter held before one eye and a narrow-angle prism held before the other eye; (b) a narrow-angle prism held before each eye, one of the prisms being fabricated from material having the required neutral density; and (c) a narrow-angle prism held before each eye, with a neutral filter being laminated to the surface of one of the prisms. In all cases, the narrow-angle prism may have a construction to be described so that it is not unduly thick.

It is found in practice that the presence of the neutral filter in the viewing device sometimes tends to produce a slight reduction in the chromostereoscopic effect. This can be offset by employing a filter which has a slightly higher transmission than the optimum value required for observation of the differential visual time-lag effect alone. In consequence, it is also within the scope of this invention to incorporate in the viewing device a variable-density neutral filter. A suitable variable-density filter may comprise, for example, two pieces of sheet polarizing material so mounted that the relative orientation of the polarizing axes of the two sheets can be varied by rotation of one of the sheets with respect to the other. Alternatively, the viewing device can be adapted to accept interchangeable filters of various densities. Similarly, the viewing device can be adapted to accept interchangeable prisms of various dioptric powers.

BRIEF DESCRIPTION OF THE DRAWINGS

FIGS. 1-5 are diagrammatic representations of the left and right eyes of an observer looking through various optical elements, and combinations thereof, in accordance with different embodiments of the invention;

FIG. 6 is a diagrammatic plan view of a scene or subject illuminated in accordance with a further embodiment of the invention.

DETAILED DESCRIPTION OF THE INVENTION

Figure 7:
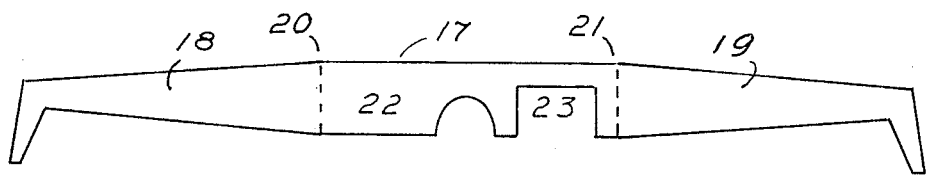
FIGS. 7-9 are elevational views showing different types of spectacles that may be used in the practice of the invention.

The representations of FIGS. 1-5 show the eyes of an observer, denoted by L and R, respectively, looking through various optical elements, and combinations thereof, in accordance with different embodiments of the invention. It is to be understood that, in each case, the optical elements may be supported in a suitable mount, such as a spectacle frame, such as will be described in conjunction with FIGS. 7-9.

In FIG. 1, the optical element comprises a single, narrow-angle prism 1, having a dioptric power suitable for enhancement of the chromostereoscopic effect, and fabricated from material having an appropriate neutral density for the production of the differential visual time-lag effect. In FIG. 2, the optical element is optically equivalent to the element of FIG. 1, but in the case of FIG. 2, the requisite neutral density is provided by a separate filter 2, which is laminated to, or in close proximity to, the narrow-angle prism 3. In FIG. 3, a neutral filter 4 is located in front of the observer's left eye, while a narrow-angle prism 5 is located in front of his right eye.

In FIG. 4, narrow-angle prisms 6 and 7 respectively are located in front of the observer's left and right eyes, the prism 6 being fabricated from a material having an appropriate neutral density for the production of the differential visual time-lag effect. The system of FIG. 5 is optically equivalent to that of FIG. 4, the prisms 8 and 9 in FIG. 5 having dioptric powers similar to those of the prisms 6 and 7 in FIG. 4. In the system of FIG. 5, however, the requisite neutral density is provided by a separate filter 10 which is laminated to, or in close proximity to, the narrow-angle prism 8.

In the case of each of the systems illustrated in FIGS. 1-5, the viewing device is intended for use with moving pictures so produced that objects moving from right to left are to appear to the observer to be nearer than objects that are stationary or moving from left to right. If the pictures are so produced that objects moving from left to right are to appear nearer than objects that are stationary or moving from right to left, then the left-eye and right-eye optical elements of the viewing device must be interchanged, but the base-inward orientation of the prisms must be maintained.

Since methods of producing variable-density filters are known, it is considered sufficient to mention that the filters of FIGS. 2, 3 and 5, which have been described as being of fixed density, may be replaced by filters of variable density. It is also understood that the wedge-shaped prisms shown in FIGS. 1-5 may be replaced by the prism shown in FIG. 7b to reduce bulkiness, as will be described.

The inventor has determined that the chromostereoscopic effect increases rapidly as the distance between the viewed images and the observer is increased. In consequence, the dioptric power of the prism necessary for the enhancement of the chromostereoscopic effect becomes less as the distance is increased, finally reaching zero. Accordingly, it is to be understood that it is within the scope of the invention to employ a viewing device, when looking at moving pictures produced in accordance with the principles hereinbefore defined, in which only a neutral filter is provided. It is considered unnecessary to provide an illustration of a device of this type as such an illustration would be the same as the system shown in FIG. 3, with the prism 5 omitted.

It has also been determined by the inventor than when moving pictures produced in accordance with the chromostereoscopic principles hereinbefore defined are viewed from a considerable distance on a large screen, as in a so-called drive-in theater, the chromostereoscopic effect predominates over the differential visual time-lag effect to the extent that an excellent impression of stereoscopic relief is obtained without the use of either a neutral filter or a prism. Hence, it is to be understood that it is also within the scope of the invention to provide moving pictures in accordance with chromostereoscopic principles and to display them to audiences unequipped with viewing devices.

In the diagrammatic plan view of FIG. 6, the letters V, I, B, G, Y, O and R are used to denote sources of illumination, such as flood lights, projecting substantially parallel beams of light, the beams being colored respectively violet, indigo, blue, green, yellow, orange and red. The beams are projected transversely to the field of a motion picture or television camera 11, which is used for recording colored images of stationary or moving objects illuminated by the different beams. It is desirable for the background 12 to have low reflectance, and to this end it should be composed, for example, of a black material.

Let us imagine, by way of example, that three stationary objects, denoted by 13, 14 and 15, of very pale hue, preferably white, are located respectively within the red, yellow and blue beams of light. Then the images of the three objects, as recorded by the camera, will be colored respectively red, yellow and blue. Hence, when the reproduced images are viewed through a refracting optical element of the type described above, they will appear to occupy the correct relative positions in space. That is, the red object will appear to be nearest to the observer, the blue object will appear to be the most distant, and the yellow object will appear to be at an intermediate location. The manner in which this principle can be extended to the use of other numbers of objects, and lights of other colors, is self-evident.

The objects may be three-dimensional or, alternatively, two-dimensional drawings produced by means, and on materials, familiar to those knowledgeable in the art of making animated cartoons. In the case of three-dimensional objects, these, of course, may be either animate or inanimate.

In order to make the best use of the principles underlying this feature of the present inventon, it is desirable to be able to introduce movement into the subject or scene being recorded so that both the chromostereoscopic and the differential visual time-lag effects can be utilized. In the following explanation of the manner in which this can be accomplished, it is to be assumed that the observer of the reproduced moving picture is provided with a prismatic viewing device having the neutral filter material in the left eyepiece.

Let us imagine that a girl in a white dress, initially at the location 13 in FIG. 6, moves pregressively, for example by dancing, in a clockwise direction to the location 16, by way of the intermediate locations 14 and 15. As she moves from the extreme foreground (red) zone to the background (violet) zone, her dress will adopt, in turn, all the spectral colors, these colors being correlated with her spatial position relative to the camera in the correct manner for production of the chromostereoscopic effect.

It will be noted, moreover, that the lateral component of the girl's movement is from right to left, with gradually decreasing velocity, as she moves from the red zone to the green zone; whereas, the lateral component is from left to right, with gradually increasing velocity, as she moves from the green zone to the violet zone. Hence, her motion is correct for the production of the differential visual time-lag effect. This combination of effects can, obviously, be enhanced by the incorporation of more girls and other subjects in the scene. In the present example, the result could readily be improved by, for instance, placing green or white artificial foliage in the green zone.

In those cases in which this spectral lighting technique is used in filming or televising two-dimensional drawings or inanimate three-dimensional subjects, the required motion can be imparted to those objects by known mechanical means. Thus, for example, drawings can be supported in frames which can be moved laterally in the appropriate directions and at appropriate velocities. In the case of three-dimensional objects, these can be supported on parallel platforms which can be moved laterally or, alternatively, such objects can be supported on a rotatable platform or turntable.

As mentioned above, FIGS. 7, 8 and 9 are front elevational views of different types of spectacles for use in the practice of the present invention.

In the case of the spectacles shown in FIG. 7, the entire spectacle frame 17, including the temple pieces 18 and 19, is fabricated from a single piece of transparent plastic material having a neutral density of approximately 1.0, that is, between 0.9 and 1.1. The frame is crimped at the locations denoted by the broken lines 20 and 21 so that the temple pieces can be folded back to fit the wearer. One of the eyes of the wearer views the displayed images through the neutral density filter material at 22, while the other eye views the images through a clear aperture 23.

Figure 8:
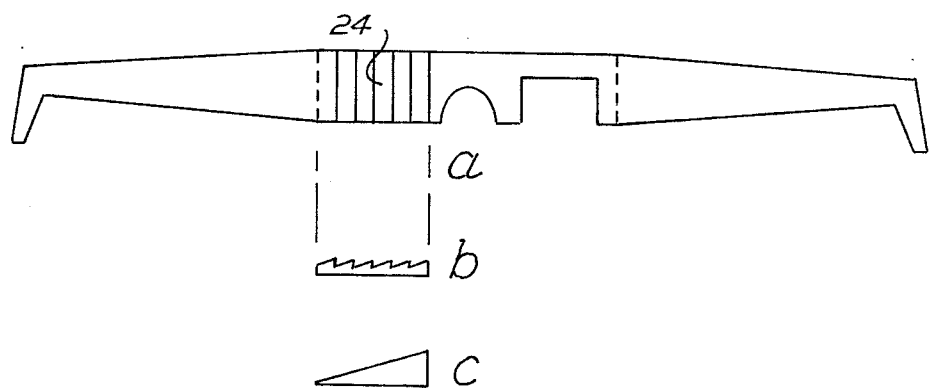

The spectacles represented in FIG. 8a are similar to those shown in FIG. 7 except that in the case of the spectacles of FIG. 8a, the portion 24 is embossed with a number of fine, parallel prismatic ridges, each of the ridges having the same prism angle. The prismatic ridges are represented in elevation by FIG. 8b. The net effect of all the ridges is the optical eqvivalent of that of a single, more bulky, wedge prism shown in FIG. 8c. For the sake of clarity in the drawings, a relatively small number of prismatic ridges are shown in FIG. 7a, on a greatly enlarged scale. In practice, however, a large number of ridges is necessary, that is, from 50 to 200 per inch, or more. As will be understood, the type of spectacles represented in FIG. 8 constitutes a practical embodiment of the principles described with reference to FIGS. 1–5.

Figure 9:
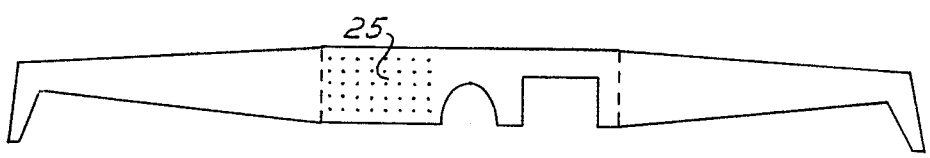

The construction of the spectacles shown in FIG. 9 is similar to that of the types shown in FIGS. 7 and 8. In the case of the spectacles of FIG. 9, however, the spectacles are fabricated from an opaque material, such as plastic or cardboard. The portion 25 is perforated with a number of fine holes so that the total cross-sectional area of all the holes amounts to approximately 10% of the total area over which the holes extend, thus providing the equivalent of a neutral density filter of approximately 1.00, that is between 0.9 and 1.1.

The spectacles of FIGS. 7 and 9 find particular utility for viewing pictures in accordance with the present invention in which the distance between the viewed images and the observer is sufficient so that a prism is unnecessary for the enhancement of the chromostereoscopic effect, and so that only a neutral filter is required for the production of the differential visual time-lag effect, as described above.

Having fully described the invention, it is to be understood that it is not to be limited to the details herein set forth, but that the invention is of the full scope of the appended claims.

What is claimed is:

1. A method for producing an animated cartoon program for exhibition on a motion picture or television screen, and for viewing the animated cartoon program, including the following steps: making two sequences of drawings, one representing background and the other representing foreground, the foreground drawings being produced with opaque pigment on transparent supports and being superimposed in order on the background drawings in close proximity thereto during the photographic operation; progressively changing in a horizontal direction the locations of characters or details in the foreground drawings relative to the locations of characters or details in the background drawings, so that when the program is exhibited the transit times of said moving characters or details will be within the limits of 1 to 8 seconds; and viewing the program through a monocular neutral filter having a density substantially between 0.9 and 1.1 to achieve a stereoscopic effect due to differential visual time-lag.

2. The method of claim 1, in which a third sequence of drawings, representing a middle ground, is added, these drawings, produced with opaque pigment on transparent supports, being placed sequentially between the foreground and background drawings in close proximity thereto during the photographic operation, the locations of characters or details in this third sequence of drawings being changed progressively in a horizontal direction relative to the locations of characters or details in the foreground and background drawings so that when the program is exhibited the transit times of the moving characters or details in the third sequence of drawings will be within the limits of one to eight seconds, and so that the transit times and directions are such that the apparent spatial separation between characters or details in the foreground drawings and those in the middle ground drawings and, likewise, between characters or details in the middle ground drawings and those in the background drawings will be correct for production of a stereoscopic effect, the magnitude of the apparent spatial separation being governed by the proportionality existing between the transit times and said apparent spatial separation.

3. The method of claim 1, in which a single further drawing, representing a middle ground, is added, this drawing, produced with opaque pigment on a transparent support, being placed between the foreground and background drawings in close proximity thereto during the entire photographic operation.

4. The method of claim 1, and which includes the step of making the colors of the characters or details in the foreground drawings of lower frequency than the colors of the characters or details in the background drawings so that the stereoscopic effect is enhanced due to chromostereoscopy.

5. The method of claim 3, and which includes the step of making the colors of the characters or details in the middle ground drawings of lower frequency than the colors of the characters or details in the background drawings and of higher frequency than the colors of the characters or details in the foreground drawings so that the stereoscopic effect is enhanced due to chromostereoscopy.

* * * * *